US007264871B2

(12) United States Patent
Nakayama et al.

(10) Patent No.: US 7,264,871 B2
(45) Date of Patent: Sep. 4, 2007

(54) HEALTH PROMOTING APPLIANCE

(75) Inventors: Yukihiro Nakayama, Saitama (JP); Zenzo Ishijima, Chiba (JP); Toshikazu Takehana, Chiba (JP); Takashi Matsumura, Chiba (JP)

(73) Assignee: Hitachi Powdered Metals Co., Ltd., Matsudo-Shi (JP)

( * ) Notice: Subject to any disclaimer, the term of this patent is extended or adjusted under 35 U.S.C. 154(b) by 0 days.

(21) Appl. No.: 10/912,147

(22) Filed: Aug. 6, 2004

(65) Prior Publication Data

US 2005/0048275 A1 Mar. 3, 2005

(30) Foreign Application Priority Data

Aug. 29, 2003 (JP) ............................ 2003-306736

(51) Int. Cl.

| | |
|---|---|
| ***B32B 5/16*** | (2006.01) |
| ***B32B 5/18*** | (2006.01) |
| ***B32B 15/08*** | (2006.01) |
| ***B32B 15/18*** | (2006.01) |
| ***C22C 33/02*** | (2006.01) |

(52) U.S. Cl. .............................. 428/317.9; 428/306.6; 428/457; 75/246

(58) Field of Classification Search ............. 428/317.9, 428/306.6, 457; 75/246

See application file for complete search history.

(56) References Cited

U.S. PATENT DOCUMENTS 4,150,776 A * 4/1979 Lesgourgues ............... 228/194

FOREIGN PATENT DOCUMENTS

| | | | |
|---|---|---|---|
| JP | 58-48186 B2 | | 10/1983 |
| JP | 61-15703 B2 | | 4/1986 |
| JP | 63317163 | * | 12/1988 |
| JP | 01195867 | * | 8/1989 |
| JP | 01209075 | * | 8/1989 |
| JP | 02252472 | * | 10/1990 |
| JP | 06211540 | * | 8/1994 |
| JP | 09039407 | * | 2/1997 |
| JP | 11235289 | * | 8/1999 |
| JP | 2003289919 | * | 10/2003 |
| JP | 2003310317 | * | 11/2003 |
| JP | 2005002424 | * | 1/2005 |

OTHER PUBLICATIONS

Ohgata, JP 01195867—Semiconductor Roller Massaging Device, Aug. 1989, abstract from Derwent (DWPI).*

* cited by examiner

*Primary Examiner*—John J. Zimmerman
*Assistant Examiner*—Jason L. Savage
(74) *Attorney, Agent, or Firm*—Birch, Stewart, Kolasch & Birch, LLP

(57) ABSTRACT

This invention provides a germanium-containing health promoting appliance which is used by making it into contact with the skin, which is produced at low cost without requiring the after-machining. The health promoting appliance is made of a sintered material composed of 2 to 20% by mass of germanium and the remainder of stainless steel, the fine pores of which are desirably sealed up by a resinous material and it is produced by sintering a green compact of desired shape of powder mixture of the above composition, under the rate of temperature rise of 10° C. per minute or less from 800° C. to the retaining temperatures of sintering at 1000 to 1300° C.

6 Claims, No Drawings

HEALTH PROMOTING APPLIANCE

This Non-provisional application claims priority under 35 U.S.C. §119(a) on of Patent Application No(s). 2003-306736, filed in Japan on Aug. 29, 2003.

BACKGROUND OF THE INVENTION

1. Field of the Invention

The present invention relates to a health promoting appliance which is used by making it into direct contact with the human skin. More particularly, the invention relates to the health promoting appliance which contains germanium.

2. Prior Art

The germanium is a well known element as a semi conductor. The germanium is also known that it produces effects to recover the functions of human body and to activate the restoration of body cells when it is used in contact with the human skin. These effects are produced by the increase of oxygen concentration in the body with releasing hydrogen from the body because the germanium is bonded with hydrogen through ionic reaction. Furthermore, the germanium has a health promoting effect because the germanium is liable to release electrons at temperatures above 32° C. and its electric charges fix up the electric current in the body.

The health promoting appliance utilizing germanium which is applied to the skin, is referred to, for example, in Patent Document 1. Because the health promoting appliance utilizes the health promoting effect of germanium, there are produced and sold several granular health promoting appliances, necklace type appliances and bracelet type appliances of cast germanium product of 99.999% in purity.

In Patent Document 2, it is pointed out that only surface portions of germanium can contribute to the curing effect in the health promoting appliances that is used in contact with the human skin. So that, skin-contact pieces are proposed, which is formed by sintering a mixture of germanium particles and particles of hardly ionizable metals such as silver, gold and tin.

Related Arts

Patent Document 1 JP-B No. 58-48186(1983)

Patent Document 2 JP-B No. 61-15703(1986)

The germanium is used for producing health promoting appliances as described above, however, the germanium has a defect that it is mechanically hard, so that it is not suitable for machining. When cast products are subjected to machining process such as cutting or grinding, cracking or chipping is liable to occur. So that, the low production yield is one of problems. Because the raw ore of germanium is rather expensive, the issue of the above low production yield is an important factor, which directly affects the production cost. Therefore, it is wanted to provide germanium health promoting appliances which can be produced without or with less machining process.

Under the above-described circumstances, the object of the present invention is to provide a germanium health promoting appliance which can be produced inexpensively without requiring machining work and also to provide a method for producing the same.

SUMMARY OF THE INVENTION

As a result of investigation concerning the utilization of powder metallurgy which is advantageous in the near-net shape formation, the inventors have accomplished the present invention for producing the health promoting appliances. More particularly, by employing powder metallurgy process, it is possible to produce the health promoting appliances without machining process and it is characterized in that the sintered product comprises 2 to 20% by mass of germanium and the balance of stainless steel. It is preferable that the fine pores of such a sintered product of health promoting appliance are sealed up with a resinous material.

The method for producing the health promoting appliance of the present invention is characterized by the process of: preparing a powder mixture of 2 to 20% by mass of germanium powder and the balance of stainless steel powder; compacting the powder mixture into a green compact of desired shape under pressure; and sintering the green compact at temperatures in the range of 1000 to 1300° C. In the sintering step, the temperature is preferably raised at a rate of 10° C. per minute or less at least from 800° C. to the sintering temperature. After the sintering process, the fine pores of sintered product are preferably impregnated with a resinous material.

EFFECT OF THE INVENTION

The germanium health promoting appliance of the present invention is produced by means of powder metallurgy, with which method the near net shape production can be achieved. Accordingly, the machining work is not required or hardly required. In addition, the health promoting appliance does not gather rust even if it is put on the human skin and comes into contact with seat, because it is composed of 2 to 20% by mass of germanium and the balance of stainless steel. Furthermore, it is possible to produce at low cost the small pieces of products, which are used in contact with the human skin with the health promoting effect owing to the ingredient of germanium.

DETAILED DESCRIPTION OF THE PREFERRED EMBODIMENTS

The health promoting appliance of the invention is applied directly to the human skin with an adhesive tape in the form of granules. Otherwise, if it is made in the form of a necklace or a bracelet, it is brought into direct contact with the skin. So that, it is necessary to prevent the rusting by sweat of human body. By using stainless steel as a major component material and additional material of germanium, both materials avoid the gathering of rust, while producing the health promoting effect owing to the germanium.

If the content of germanium in the health promoting appliance is less than 2% by mass, the health promoting effect is not sufficient. On the other hand, if the content of germanium is more than 20% by mass, the abrasion of die is caused to occur in compacting process, which is owing to the hardness and the low toughness of germanium powder. Moreover, the compressibility of powder material becomes low and the density of green compact cannot be increased, so that both the density and corrosion resistance of obtained sintered product become low. Accordingly, the content of germanium is preferably in the range of 2 to 20% by mass. Within this range, the germanium diffuses into stainless steel matrix as solution in an alloy state. In the present invention, the germanium generates a liquid phase in sintering, so that the amount of fine pores decreases to avoid the rust gathering. The effect of this kind cannot be observed in the case that tourmaline ore is used as disclosed in the above-mentioned Patent Document 3.

The stainless steel is prescribed in JIS (Japanese Industrial Standard), AISI (American Iron and Steel Institute) and BS (British Standard) such that austenitic stainless steel is composed of indispensable component of 15 to 26% by mass of chromium, 3.5 to 28% by mass of nickel and 0.15% by mass or less of carbon; ferritic stainless steel is composed of indispensable component of 11 to 32% by mass of chromium and 0.12% by mass or less of carbon without nickel, and martensitic stainless steel is composed of indispensable component of 11.5 to 18% by mass of chromium and 1.2% by mass or less of carbon.

Among them, the austenitic stainless steel is suitable for producing the health promoting appliance which is used in direct contact with the skin, because the corrosion resistance of the material is highest. However, the ferritic stainless steel powder is softer and has higher compressibility, so that both the materials may be used together with taking the merits of them.

Because the appliance of the present invention is produced by the powder metallurgy process, near-net shape products can be obtained, which fact is the specific advantage of this method. Accordingly, it is possible to omit or minimize the finishing of products by machining. If fine pores remain in the products due to the powder metallurgical method, even when stainless steel is used, there is apprehension that the fine pores of products absorb sweat and gather rust by pitting corrosion. So that, it is effective to seal up the pore openings by impregnating them with a resinous material to prevent the sweat from invasion. Especially, when ferritic stainless steel is used as a base material, which is inferior to austenitic stainless steel in corrosion resistance, the sealing up by impregnating with resinous material is especially advisable. Exemplified as the resins for impregnation are acrylic resin, polyvinyl chloride resin, polyurethane resin, silicone resin, polyester resin and polyamide resin.

The above-described health promoting appliance can be produced by adding 2 to 20% by mass of germanium powder to stainless steel powder, then compacting the powder mixture into a green compact of desired shape, and sintering the green compact at temperatures in the range of 1000 to 1300° C. When the sintering temperature is lower than 1000° C., powder particles are not diffused together sufficiently during the sintering, so that the sintered material is not densified sufficiently. This causes the increase of remaining fine pores and the lowering of corrosion resistance. On the other hand, if the sintering is carried out above 1300° C., it is not desirable because sintered products easily get out of shape by partial melting.

As described above, the germanium element of germanium powder is subjected to solid-phase diffusion into the stainless steel matrix during the process to raise temperatures in sintering. At temperature of about 800° C., the germanium generates a liquid phase to cause the liquid-phase sintering and it contributes to the densification of sintered products by the uniform diffusion of germanium and the diffusion of stainless steel powder in sintering process. If the generation of this liquid phase occurs too rapidly, the sintered products often get blisters on their surfaces and their external appearance becomes worse. Therefore, it is preferable to heat up slowly by 10° C. per minute or less at least in the range of a temperature of 800° C. to the sintering temperature.

The thus obtained sintered product is densified owing to the generation of the liquid phase germanium. Therefore, the product hardly contains fine pores and has excellent corrosion resistance.

In addition, when the higher corrosion resistance of the health promoting appliance of the present invention is required because it is used by sticking or applying to the skin directly, it is effective for the higher corrosion resistance to seal up the fine pore openings by impregnating them with a resinous material, so that the fine pores suffered from pitting corrosion can be prevented.

EXAMPLE

Powder mixtures were prepared by mixing germanium powder with stainless steel powder of SUS 304 as specified in JIS (corresponding to AISI 304) at ratios as indicated in the following Table 1. The powder mixture was subjected to continual compacting process under a pressure of 686 MPa to form 100 of top-shaped test pieces, for use as Sample Nos. 01 to 21. Each test piece was ϕ7 mm in the base diameter, 1.65 mm in the height (thickness) of base and 1 mm in the height of the conical portion from the base to the top of cone.

After this continual compacting, the state of die was observed with naked eyes. If the abrasion of die was found, the sample was judged to be unsuitable for the practical production and subsequent steps were stopped. When no abrasion of die was observed, 22 test pieces out of the above 100 green test pieces were sintered by the conditions as indicated in Table 1 under the atmosphere of hydrogen gas to obtain sintered samples. In the sintering, the rate of temperature rise to 800° C. was 20° C./minute. In the case that the external appearance of the sintered sample was observed as no good, it was judged to be unsuitable for the production and the subsequent experiment was stopped. Concerning sintered samples having good appearances, the relative density of one of sintered samples was measured and another sintered sample was subjected to the observation of metal structure of its cross-section. The remaining 20 test samples of the respective 21 kinds of Samples, were partially impregnated with acrylic resin. As comparative samples, 20 test pieces containing 99.999% by mass of germanium in the same shape were produced by casting. These samples were named as Sample No. 22.

The appearances of Sample Nos. 01 to 21 were the same as the color of stainless steel matrix, however, the color of Sample No. 22 was blackish to some extent. So that, these samples were colored with a black coating material in order to avoid discrimination of one from another in view of their appearances and they were supplied to test parsons for patch test.

The test samples prepared through the above procedure were distributed to test persons so as to stick the samples to their skins by adhesive plasters of ϕ20 mm in diameter. After the passage of three months, the rust formation owing to the contact with the skin was examined and the curing effect to stiff shoulders was checked by obtaining information by means of questionnaires. The results thereof are also shown in Table 1.

Respective 20 test samples of each of Sample Nos. 01 to 03, 14 and 22, which contained different amount of germanium, were supplied to 100 test persons at random, i.e., one test sample was applied to one person. The effect of the content of germanium and the rust formation were confirmed. Concerning the test samples of Sample Nos. 04, 05 and 07 to 12, each of forty test persons chose four test samples at random and put them simultaneously to inspect the effect of sintering conditions and observed the rust formation.

The respective pairs of Sample Nos. 16 and 17, 18 and 19, and 20 and 21, in which pair the stainless steel powder of the same kind was used but one was impregnated with a resin but the other was not impregnated. For each pair of Samples using the same stainless steel powder, 20 test persons were selected (60 persons in total). The pair of test samples with resin impregnation and without resin impregnation were supplied to each test person (2 samples/person). The effect of the resin impregnation and the rusting owing to the difference in the kind of stainless steel powder were examined. The result of the foregoing experiments done by 200 test persons were also shown in Table 1.

did not gather rust and caused no problem in corrosion resistance due to the content of germanium.

In Sample No. 06, the liquid phase of germanium was generated abruptly because the rate of temperature rise from of 800° C. to the retention temperature of sintering was more than 10° C. per minute. The blistering was caused to occur on sintered products and subsequent experiment was stopped. Meanwhile, Sample Nos. 03 and 05 in which the

TABLE 1

| Sample No. | Mixing Ratio % by mass: SUS Powder | Mixing Ratio % by mass: Germanium Powder | Temp. Rise ° C./min 800° C. to Sintering Temp. | Sintering Temp. ° C. | Relative Density % | Resin Impregnation | Rusting | Number of Test Persons: Not Effective | Number of Test Persons: Effective | Remark |
|---|---|---|---|---|---|---|---|---|---|---|
| 01 | 316 | 0 | 7 | 1150 | 83 | Yes | No | 20 | 0 | |
| 02 | 316 | 2 | 7 | 1150 | 85 | Yes | No | 4 | 16 | |
| 03 | 316 | 10 | 7 | 1150 | 89 | Yes | No | 0 | 20 | |
| 04 | 316 | 10 | 7 | 1150 | 89 | No | No | 0 | 20 | |
| 05 | 316 | 10 | 10 | 1150 | 89 | Yes | No | 0 | 20 | |
| 06 | 316 | 10 | 15 | 1150 | — | — | — | — | — | *1 |
| 07 | 316 | 10 | 7 | 850 | 78 | Yes | Allover | 0 | 20 | |
| 08 | 316 | 10 | 7 | 950 | 80 | Yes | Allover | 0 | 20 | |
| 09 | 316 | 10 | 7 | 1000 | 86 | Yes | No | 0 | 20 | |
| 10 | 316 | 10 | 7 | 1250 | 93 | Yes | No | 0 | 20 | |
| 11 | 316 | 10 | 7 | 1250 | 93 | No | No | 0 | 20 | |
| 12 | 316 | 10 | 7 | 1300 | 97 | Yes | No | 0 | 20 | |
| 13 | 316 | 10 | 7 | 1350 | — | — | — | — | — | *2 |
| 14 | 316 | 20 | 7 | 1150 | 92 | Yes | No | 0 | 20 | |
| 15 | 316 | 30 | — | — | — | — | — | — | — | *3 |
| 16 | 304 | 10 | 7 | 1150 | 90 | Yes | No | 0 | 20 | |
| 17 | 304 | 10 | 7 | 1150 | 90 | No | No | 0 | 20 | |
| 18 | 430 | 10 | 7 | 1150 | 91 | Yes | No | 0 | 20 | |
| 19 | 430 | 10 | 7 | 1150 | 91 | No | Trace | 0 | 20 | |
| 20 | 436 | 10 | 7 | 1150 | 90 | Yes | No | 0 | 20 | |
| 21 | 436 | 10 | 7 | 1150 | 90 | No | Trace | 0 | 20 | |
| 22 | Cast Germanium (Purity: 99.999% by mass) | | | | 100 | — | No | 0 | 20 | |

*1: Blisters were formed on allover the surface of sintered products.
*2: Products gotten out of shape.
*3: Die abrasion occurred.

In view of Table 1, in all samples containing 20% by mass or less of germanium, the abrasion of die was not observed after the continual compacting of 100 pieces of test samples and was followed by subsequent processes. However, in Sample No. 15 containing more than 20% by mass of germanium, the abrasion of die was caused to occur after continual compacting of 100 test samples, so that the making of test samples was stopped. Accordingly, it was confirmed that the addition quantity of germanium is 20% by mass or less for the compacting of power material.

The metallic structure of other test samples which were subjected to subsequent sintering step, were observed. It was understood that the germanium which was added as germanium powder, was diffused into stainless steel matrix as solid solution and alloyed in the matrix.

In view of the results of application of Sample Nos. 01 to 03, 14 and 22, it was known that the samples containing 2% by mass or more of germanium produced curing effect. In addition, it was confirmed that the sample containing 10% by mass or more of germanium has a comparable effect to that of the cast product of 99.999% by mass of germanium. Accordingly, it was known that germanium produces curing effect without any problem, even if it forms an alloy with the stainless steel matrix. It was also confirmed that any samples rate of temperature rise up to the retention temperature of sintering is 10° C. or less per minute, were subjected to the application tests on test persons and, as a result, a good curing effect and satisfactory corrosion resistance were obtained.

Accordingly, it was confirmed that the rate of temperature rise from 800° C. to the retention temperature of sintering must be 10° C. per minute or less for the sintered products having satisfactory properties.

The experiment of Sample No. 13 was stopped after the sintering step because the appearance thereof was not good. This was caused by the fact that test samples were out of shape owing to excess shrinkage in sintering due to the temperature of sintering being over 1300° C. In view of the results of application test of Sample Nos. 03, 07 to 10, 12 and 13, it was confirmed that Sample Nos. 07 and 08, in which the retention temperature in sintering was lower than 1000° C., had large quantities of remained fine pores that were caused by the insufficient densification during the sintering. Even when a resin was impregnated, these samples gathered rust in allover surface portions. So that, it was confirmed that the retention temperature of sintering is preferably in the range of 1000 to 1300° C.

By comparing Sample Nos. 03, 10, 16, 18 and 20 (impregnated with resin) with Sample Nos. 04, 11, 17, 19 and 21 (without resin impregnation), it was possible to examine the influence of the kind of stainless steel in curing effect and corrosion resistance, and the effect of resin impregnation. In view of the results, it was understood that any of austenitic stainless steel and ferritic stainless steel had curing effect. In Sample Nos. 19 and 21, which were composed of SUS 430 (AISI 430) or SUS 436 (AISI 436), respectively without resin impregnation, trace amount of rust were observed. Although the formation of rust was not the extent to cause health problem, the test samples are desirably impregnated with resin according to the kind of stainless steel, in view of that they are used in direct contact with the human skin.

INDUSTRIAL APPLICABILITY

This invention provides a health promoting appliance which is produced by powder metallurgy process without requiring after-machining. The health promoting appliance is excellent in corrosion resistance and produces health promoting effect owing to germanium, because it is made of sintered material containing 2 to 20% by mass of germanium and the remainder of stainless steel. Accordingly, it is possible to provide at low cost the health promoting appliances, which is used by sticking to or bringing it into contact with the human skin directly such as accessories.

What is claimed is:

1. An appliance made of sintered material, wherein the sintered material consists essentially of:

2 to 20% by mass of germanium and the remainder of stainless steel.

2. The appliance as claimed in claim 1, wherein said germanium is diffused into a matrix of stainless steel as a solution in an alloy state.

3. The appliance as claimed in claim 1, wherein the sintered material has fine pores and the fine pores of the sintered material are sealed by a resinous material.

4. An appliance made of sintered material, wherein the sintered material comprises:

2 to 20% by mass of germanium and the remainder of stainless steel.

5. The appliance as claimed in claim 4, wherein said germanium is diffused into a matrix of stainless steel as a solution in an alloy state.

6. An appliance made of sintered material, wherein the sintered material comprises:

2 to 20% by mass of germanium and the remainder of stainless steel, and wherein the sintered material has fine pores and the fine pores of the sintered material are sealed by a resinous material.

* * * * *